United States Patent
Huang et al.

[11] Patent Number: 5,995,991
[45] Date of Patent: Nov. 30, 1999

[54] FLOATING POINT ARCHITECTURE WITH TAGGED OPERANDS

[75] Inventors: Biing-Huang Huang; Shing-Wu Tung, both of Taipei, Taiwan

[73] Assignee: Industrial Technology Research Institute, Hsinchu, Taiwan

[21] Appl. No.: 08/677,551

[22] Filed: Jul. 18, 1996

[51] Int. Cl.$^6$ ........................................... G06F 7/38
[52] U.S. Cl. ............................................... 708/495
[58] Field of Search ................... 364/736.01, 736.02, 364/736.03, 736.04, 736.05, 736.06, 736.5, 748.01, 748.11, 748.16, 748.02, 748.03, 745.01, 745.02

[56] References Cited

U.S. PATENT DOCUMENTS

| | | | |
|---|---|---|---|
| 4,847,802 | 7/1989 | Ashton | 708/495 |
| 5,630,160 | 5/1997 | Simpson et al. | 364/748 |
| 5,748,516 | 5/1998 | Goddard et al. | 364/748.03 |
| 5,761,105 | 6/1998 | Goddard et al. | 364/748.16 |

*Primary Examiner*—Emmanuel L. Moise
*Attorney, Agent, or Firm*—Proskauer Rose LLP

[57] ABSTRACT

A method for representing arithmetic values on which arithmetic operations can be performed uses operands having a fixed number of bits. In a first step, a plurality of operands are stored in a memory, wherein each operand has a bit pattern representing a particular value. In a second step, a tag associated with each of the operands is also stored in the same or a different memory. Each of the tags has a tag value that indicates whether or not its associated operand represents an ordinary operand value or a special operand value. If the operand represents a special operand value, the tag value also indicates which of a predefined set of special operand values is represented by the associated operand. A result of an arithmetic operation can be generated by, in a first step, inputting at least a first operand and a first tag to an arithmetic section. In a second step, the arithmetic section determines a value of the result of the arithmetic operation based on the special operand indicated by the first tag and independently of a value of the first operand. A tag associated with a result of an arithmetic calculation can be generated by, in a first step, generating in an arithmetic section a result of an arithmetic operation on at least one operand. If the generation of the result produces one of a predetermined set of special operands, a tag generator generates a tag having a predetermined tag value corresponding to the produced special operand. Illustratively the tag generator alternatively generates a predetermined tag value indicating that the result is not a special operand if the result is not a special operand.

13 Claims, 3 Drawing Sheets

5,995,991

FLOATING POINT ARCHITECTURE WITH TAGGED OPERANDS

FIELD OF THE INVENTION

The present invention relates to arithmetic logic unit (ALU) architectures, and more particularly, to floating point ALU architectures.

BACKGROUND OF THE INVENTION

FIG. 1 shows a conventional circuit 10 for performing arithmetic operations on one or more floating point operands. Illustratively, each operand has a fixed number of bits i.e., 32, 64, etc. According to standard IEEE format, a 32 bit floating point number has one sign bit, eight exponent bits and twenty three magnitude bits with an implicit bit. If the sign is s, the exponent is e and the magnitude is m, the value of the floating point operand is $(-1)^s \cdot m \cdot 2^{e-127}$. The magnitude m is a fractional value with its first non-zero digit aligned with the most significant bit position of the magnitude (unless, as described below, the value of the floating point operand is a special operand value). This property of the magnitude is referred to as normalization. Often, as a result of a calculation, or for purposes of performing a calculation, the first non-zero digit of the value of the magnitude is not aligned with the most significant bit of the magnitude portion of the floating point number. In such a case, the magnitude or floating point number is said to be denormalized. Such a magnitude can be normalized by shifting the decimal place of the value of the magnitude until the first non-zero bit is aligned with the most significant bit position of the magnitude portion of the floating point number and by increasing or decreasing the exponent to indicate the number of bit positions by which the magnitude value has been shifted. IEEE format also provides similar formats for higher precision floating point numbers. Other similar floating point number formats also exist. However, this invention is illustrated herein using the above 32 bit IEEE standard, without loss of generality.

One or more operands x and y are supplied from a memory device, such as a register file 12. The operands x and y are inputted to an arithmetic section 14, which includes a denormalizer and normalizer. The denormalizer equalizes the exponents of the two operands by shifting the decimal point of one operand relative to the other for an addition or subtraction arithmetic operation. The normalizer normalizes the result of the arithmetic operation, which, for example, may have been an addition, a subtraction, a multiplication, or division operation.

Certain mathematical values are not easily represented in the above-described sign, exponent, magnitude format or present difficulty in performing calculations. These mathematical values are zero, infinity and "not a number." For instance, due to constraints on fixed word-sized floating point numbers, it is impossible to represent the value infinity so that it satisfies $(-1)^s \cdot m \cdot 2^{e-127}$. On the other hand, although the value zero can be represented so that it satisfies $(-1)^s \cdot m \cdot 2^{e-127}$, the number zero can neither be normalized nor denormalized. The IEEE standard provides a single precision format as the following representations for such mathematical values:

(1) sign='0' or '1' bit, exponent=a sequence of eight '0' bits, magnitude=a sequence of twenty-three '0' bits to indicate that the result is a zero value, (2) sign='0' or '1' bit, exponent=a sequence of eight '0' bits, magnitude=a '0' bit followed by a sequence of twenty-two bits, including at least one non-zero bit, to indicate that the result is not a number with signalling (i.e., generation of an error exception), (3) sign='0' or '1' bit, exponent=a sequence of eight '0' bits, magnitude=a '1' bit followed by sequence of twenty-two bits to indicate that the result is not a number with no signalling, (4) sign='1' bit, exponent=a sequence of eight '1' bits, magnitude=a sequence of twenty-three '0' bits to indicate that the result is negative infinity, and (5) sign='0' bit, exponent=a sequence of eight '1' bits, magnitude=a sequence of twenty-three '0' bits to indicate that the result is positive infinity.

Operands that have one of the above-noted bit patterns for representing a respective mathematical value are referred to as "special operands." A denormalized number can also be referred to as a special operand in certain ALU models. For instance, in a "fast" ALU model, a denormalized number can be treated as zero in certain operations. In addition, certain user defined values can be treated as special operands. For example, if the ALU must calculate sin nπ (n is an integer) frequently, the bit pattern for nπ can be treated as a special operand. Lastly, specific predefined constants, e.g., such as Euler's number can be provided predefined bit patterns. Such bit patterns are also special operands. All other operands are referred to as "ordinary operands."

A special operand generator circuit 22 is provided at the output of the arithmetic section 14 for determining whether or not the result of the arithmetic operation performed in the arithmetic section 14 is a special operand value, and which operand value the result equals.

These are summarized as follows:

(a) The result is the zero valued special operand if:
  (i) the magnitude of the result is zero, or
  (ii) a division operation is performed wherein the divisor is infinity and the dividend is zero or a finite number.

(b) The result is the infinity valued special operand if:
  (i) a division operation is performed wherein the dividend is infinity but the divisor is not zero,
  (ii) a multiplication, addition or subtraction arithmetic operation is performed wherein one operand is infinity, or a division operation is performed wherein the dividend is infinity and the divisor is an ordinary operand, or
  (iii) if the result is overflow.

(c) The result is not a number if:
  (i) any operation is performed on an operand that is not a number, or
  (ii) any invalid operation is performed such as the square root of a negative number, a division operation is performed wherein both the dividend and divisor are zero or the dividend is infinity and the divisor is zero, etc.

When the arithmetic section 14 performs one of the operations listed above that results in a value other than an ordinary operand value, the arithmetic unit outputs a signal indicating that the result is zero, infinity or not a number to the generator circuit 22. In response, the circuit 22 generates the appropriate output floating point number as per the above noted IEEE standard of special operands set.

Note that often the result of the arithmetic calculation can be determined without actually performing all of the ordinary steps of the arithmetic calculation when one or more of the operands is a special operand. See, e.g., MANO, COMPUTER ARCHITECTURE sec. 10-4, p. 377–387 (1982). Many of these results are noted above. In addition to these, suppose a first operand is to be added to a second operand or the first operand is to be subtracted from the second operand. If the first operand is the zero valued special operand, then the result must be equal to the second operand. Likewise, if the first operand is to be subtracted from the second operand and the second operand is the zero valued special operand, the result must have a magnitude and exponent that equal the magnitude and exponent of the first operand and a sign of opposite polarity as the second operand.

Interposed between the register file and the arithmetic section 14 are detectors 24 and 26. One detector 24 or 26 is provided for each operand input path. The detectors 24 and 26 each receive a respective operand x or y and determines whether or not the received operand represents a special operand. If not, the detector 24 or 26 simply outputs the operand x or y to the arithmetic section 14. However, if the detector 24 or 26 detects that the operand x or y represents a special operand, the detector 24 or 26 identifies the type of the operand—the detector determines which of the special operands the received operand x or y represents. The detector 24 or 26 then outputs an indication of the type of the operand to the arithmetic section 14. As a result, the arithmetic section 14 generates the appropriate result using fewer steps as would normally be necessary. For instance, two ordinary operands are added (subtracted) by normalizing the operand with the smaller exponent relative to the operand with the larger exponent, adding (subtracting) the magnitudes of the two operands, e.g., using a carry look-ahead or carry save adder, and then normalizing the result. See U.S. Pat. No. 4,758,974. Likewise, two ordinary operands are multiplied (divided) by multiplying (dividing) the magnitudes of the two ordinary operands, e.g., using a Booth multiplier, adding (subtracting) the exponents of the two operands and then normalizing the result. The detectors 24, 26 cause the arithmetic section 14 to avoid performing such steps (which would either be impossible, erroneous or simply time consuming) and instead to generate control signals (exp_sel, mag_sel) and/or result sign (result_sgn), magnitude (result_mag) and exponent (result_exp) as per the predetermined rules set forth above.

FIG. 2 shows an exemplary special operand generator circuit 22 in greater detail. As shown, the special operand generator circuit 22 includes first and second multiplexers 222 and 224. The first multiplexer 222 has a first input receiving a sequence of eight '0' bits, a second input receiving a sequence of eight '1' bits and a third input receiving an exponent that is outputted from the arithmetic section 14. The first multiplexer 222 also receives selector control signals exp_sel from the arithmetic section 14. The second multiplexer 224 has a first input receiving a sequence of twenty-three '0' bits, a second input receiving a sequence including a first '0' bit followed by a sequence of twenty-two bits that have at least one non-zero bit, a third input receiving a sequence including a '1' bit followed by sequence of twenty-two bits and a fourth input receiving the magnitude outputted from the arithmetic section 14. The second multiplexer 22 also receives selector control signals mag_sel from the arithmetic section 14.

The arithmetic section 14 outputs appropriate selector control signals exp_sel, mag_sel to the multiplexer 222 to output a resulting exponent, and to the multiplexer 224 to output a resulting magnitude of an arithmetic operation. The sign bit result_sgn is separately outputted from the arithmetic section 14 and appended to the exponent and magnitude outputted from the multiplexers 222 and 224. When the result of an arithmetic operation is zero, the arithmetic section outputs selector control signals exp_sel and mag_sel to the multiplexers 222 and 224 for selecting the eight '0' bits for the exponent and twenty-three '0' bits for the magnitude. When the result of an arithmetic operation is infinity, the arithmetic section 14 outputs selector control signals exp_sel and mag_sel to the multiplexers 222 and 224 for selecting the eight '1' bits for the exponent and the twenty-three '0' bits for the magnitude. When the result of an arithmetic operation is not a number with signalling, the arithmetic section 14 outputs selector control signals exp_sel and mag_sel to the multiplexers 222 and 224 for selecting eight '1' bits for the exponent and the '0' bit followed by twenty two bits including at least one '1' bit as the magnitude. Likewise, when the result of an arithmetic operation is not a number without signalling, the arithmetic section 14 outputs selector control signals exp_sel and mag_sel to the multiplexers 222 and 224 for selecting the eight '1' bits as the exponent and the '1' bit followed by twenty-two bits as the magnitude. In all other cases, the arithmetic section 14 outputs selector control signals exp_sel and mag_sel to the multiplexers 222 and 224 for selecting the exponent and magnitude generated in the arithmetic section 14 as the result exponent and magnitude.

FIG. 3 shows a conventional detector 24 or 26. As shown, the detector 24 or 26 includes two comparator circuits 252 and 254. The comparator 252 receives the exponent (x_exp or y_exp) of the inputted operand x or y and compares it to a sequence of eight '0' bits and a sequence of eight '1' bits. If the exponent is the same as the sequence of eight '0' bits, the comparator 252 outputs a logic '1' bit on the line 255. If the exponent is the same as the sequence of eight '1' bits, the comparator 252 outputs a logic '1' bit on the line 256. In all other circumstances, the comparator 252 outputs logic '0' bits on the lines 255 and 256. The comparator 254 receives the magnitude (x_mag or y_mag) of the inputted operand x or y and compares it to the sequence of twenty-three '0' bits. If the magnitude is the same as the sequence of twenty-three '0' bits, the comparator 254 outputs a logic '1' bit on the line 257. If not, the comparator 254 outputs a logic '1' bit on the line 258.

Three AND gates 261, 262 and 263 are also provided. The AND gate 261 receives as inputs the logic bits outputted on the lines 255 and 257. The AND gate 261 therefore outputs a signal indicating whether or not the operand represents a zero valued special operand (a logic '1' indicating that the operand represents the zero valued special operand). The AND gate 262 receives as inputs, the logic bits outputted on the lines 256 and 257. The AND gate 262 therefore outputs a signal indicating whether or not the operand represents infinity (either negative or positive) (a logic '1' indicating that the operand represents the infinity valued operand). The AND gate 263 receives as inputs the logic bits outputted on the lines 256 and 258. The AND gate 263 therefore outputs a signal indicating whether or not the operand represents a non-number special operand (with or without signalling) (a logic '1' indicating that the operand is a non-number special operand). Each of the signals outputted by the AND gates 261–263 of the detectors 24 and 26 are inputted to the arithmetic section 14. Illustratively, the arithmetic section 14 has combinatorial logic for translating these signals, and possibly the values of the operands, to the outputted exponent and magnitudes and control signals exp_sel and mag_sel provided to the generator circuit 22 of FIGS. 1 and 2. See, e.g., Joseph J. F. Cavanagh, Digital Computer Arithmetic Design and Implementation, p.384.

A disadvantage of the architecture shown in FIGS. 1–3 is that detectors 24 and 26 must be provided in the input path of each operand to determine whether or not the operand represents a special operand, and if so, which special operand value is represented. A detector is necessary because nearly all of the bits of the operand must be examined to determine if the operand represents a special operand value. This introduces a latency into the arithmetic processing of the calculation circuit 10.

It is an object of the invention to overcome the disadvantages of the prior art.

SUMMARY OF THE INVENTION

This and other objects are achieved by the present invention. According to one embodiment, a method is provided for representing arithmetic values on which arithmetic operations can be performed using operands having a fixed number of bits. In a first step, a plurality of operands are stored in a memory, such as a register file, RAM, etc., wherein each operand has a bit pattern representing a particular value. In a second step, a tag associated with each of the operands is also stored in the same or a different memory. Each of the tags has a tag value that indicates whether or not its associated operand represents an ordinary operand value or a special operand value. If the operand represents a special operand value, the tag value also indicates which of a predefined set of special operand values is represented by the associated operand.

According to another embodiment, a method for generating a result of an arithmetic operation is provided. In a first step, at least a first operand and a first tag that indicates whether or not the first operand is a special operand of a predetermined set of special operands are inputted to an arithmetic section. Note that the first tag also indicates which of the special operands is represented by the first operand. In a second step, the arithmetic section determines a value of the result of the arithmetic operation based on the special operand indicated by the first tag and independently of a value of the first operand.

According to yet another embodiment, a method for generating a tag associated with a result of an arithmetic calculation is provided. In a first step, an arithmetic section generates a result of an arithmetic operation on at least one operand. If the generation of the result produces one of a predetermined set of special operands, a tag generator also generates a tag having a predetermined tag value corresponding to the produced special operand. Illustratively, another step may also be provided in which the tag generator generates a tag having a predetermined tag value indicating that the result is not a special operand if the result is not a special operand.

By providing tags for each operand indicating whether, and which, special operand value the associated operand represents, the detectors can be omitted from each operand input path to the arithmetic section. Alternatively, the detectors are present for executing operands of unknown type but can be avoided by those operands whose type is specified by the respective tags. In either scenario, average processing latency is reduced.

DETAILED DESCRIPTION OF THE INVENTION

In accordance with an embodiment of the present invention, a tag is associated with each operand on which arithmetic operations may be performed. For example, the tag may be a three bit value indicating one of eight possible operand types. (Note that the prior art has previously suggested associating tags with operands. See U.S. Pat. No. 4,847,802. However, the conventional tags disclosed in the prior art merely indicate precision, i.e., number of bits, in the associated operand. The tags of the present invention can be provided in addition to such precision indicating tags or the precision indicating tags may be omitted.) The following is an illustrative list of tag values and their respective operand types:

TABLE 1

Tag values and designated operand types

| Tag | Operand type |
| --- | --- |
| 000 | Unsupported |
| 001 | Not a number |
| 010 | Normalized |
| 011 | Infinity |
| 100 | Zero |
| 101 | Empty (Invalid) |
| 110 | Denormalized |
| 111 | Unknown |

Of these operand types, note that the tags '000' (unsupported), '001' (not a number), '011' (infinity), '100' (zero) and '101' (empty/invalid) are special operand types. Each of the special operand types can be processed to a result in a simplified and fast fashion from the tag value alone without reference to the value of the corresponding operand. (In addition to those special operands discussed in detail above, the unsupported and empty/invalid tags indicate special operand types on which any arithmetic operation produces the not a number result value.) The tag '110' (denormalized) can be treated as a special operand in "fast mode" as producing the same result as producing the same result as the tag '100' (zero). The tags '010' (normalized) and '111' (unknown) indicate ordinary operands. Ordinary operands must be processed using the conventional steps of their respective arithmetic operations on the value of the corresponding operands. For example, to multiply two ordinary operands, Booth's algorithm may be performed on the magnitudes of the operands and the exponents may be added together. Thereafter, the product magnitude and sum exponent thus produced might require normalization. On the other hand, if a multiplication is to be performed on two operands where one of the operands is one of the above noted special operands, then none of these steps (Booth's algorithm on the magnitudes, addition on the exponents and normalization) are performed on the operands. Rather, the result is predefined and may be determined as described below.

Figure 1:
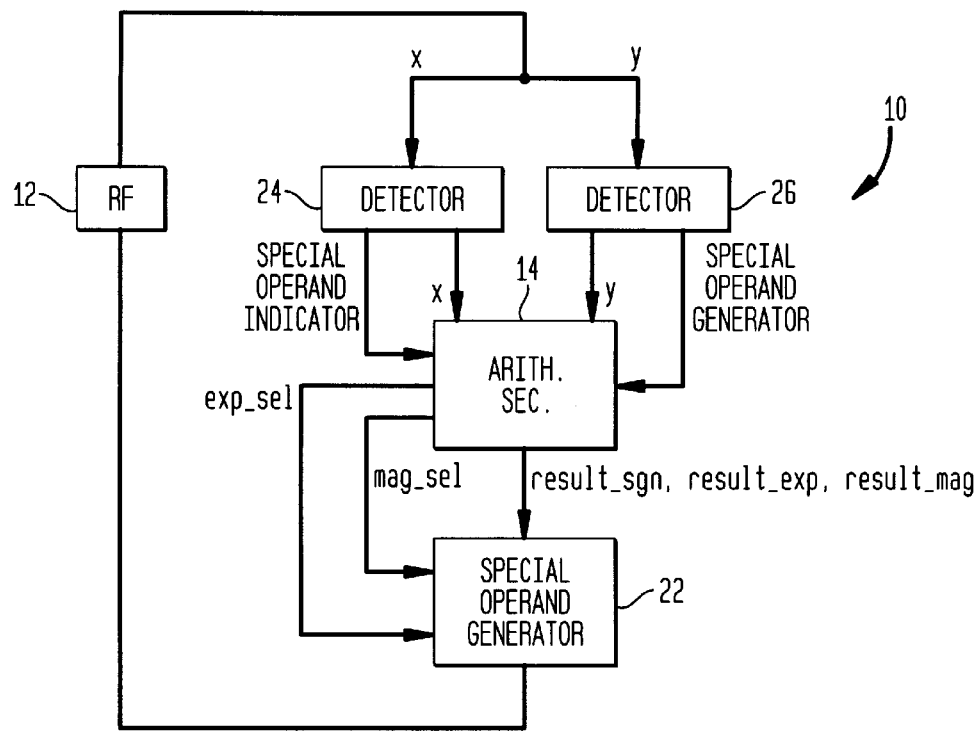
FIG. 1 shows a conventional arithmetic calculation circuit.
Figure 4:
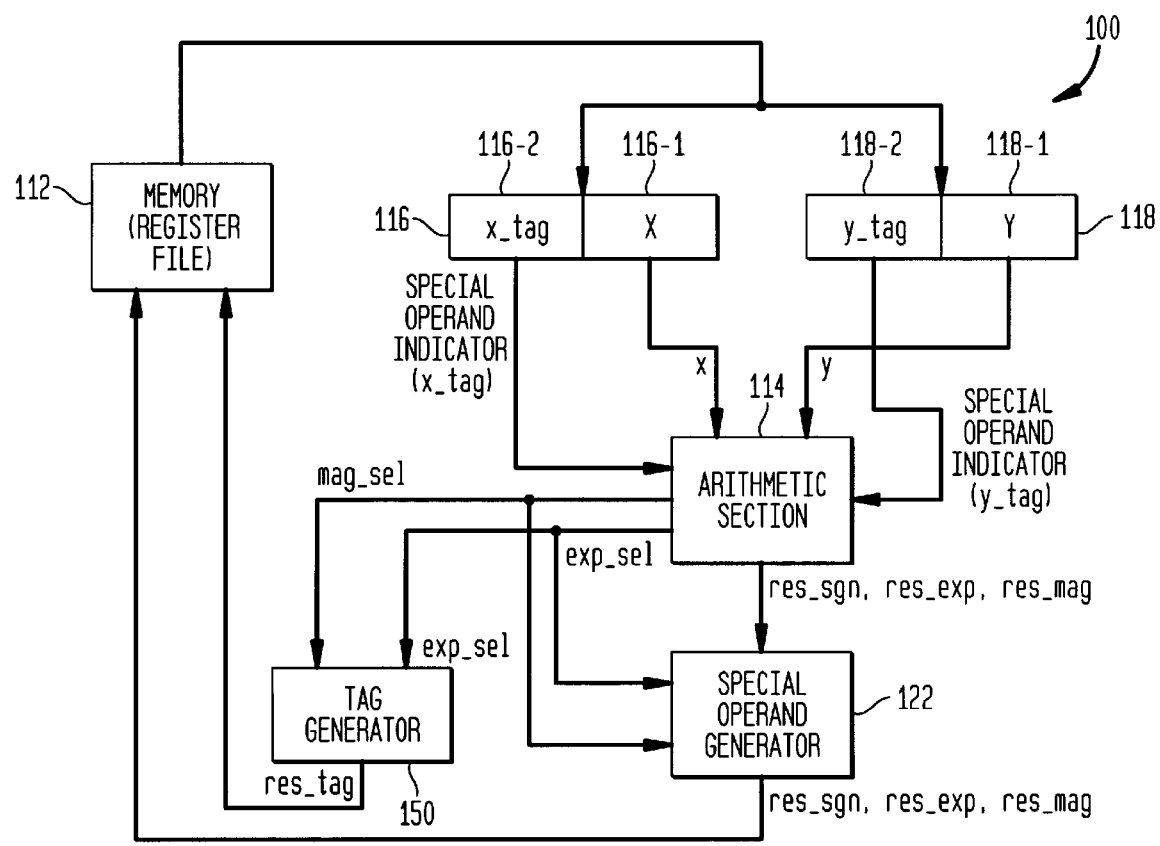
FIG. 4 shows an arithmetic calculation circuit according to an embodiment of the present invention.

FIG. 4 shows an arithmetic calculation circuit 100 according to an embodiment of the present invention. As before, the arithmetic calculation circuit 100 includes a memory, such as a register file 112, and an arithmetic section 114. X and Y operand registers 116 and 118 are shown which may be part of the register file 112. As shown, each of the registers 116 and 118 has an operand value storage portion 116-1 and 118-1 and a tag value storage portion 116-2 and 118-2. Connected to the output of the arithmetic section 114 is a special operand generator 122, that is similar to the special operand generator 22 of FIG. 1. Also connected to the arithmetic section 114 is a tag generator circuit 150, which receives the same select control signals exp_sel and mag_sel as the special operand generator 122.

Figure 2:
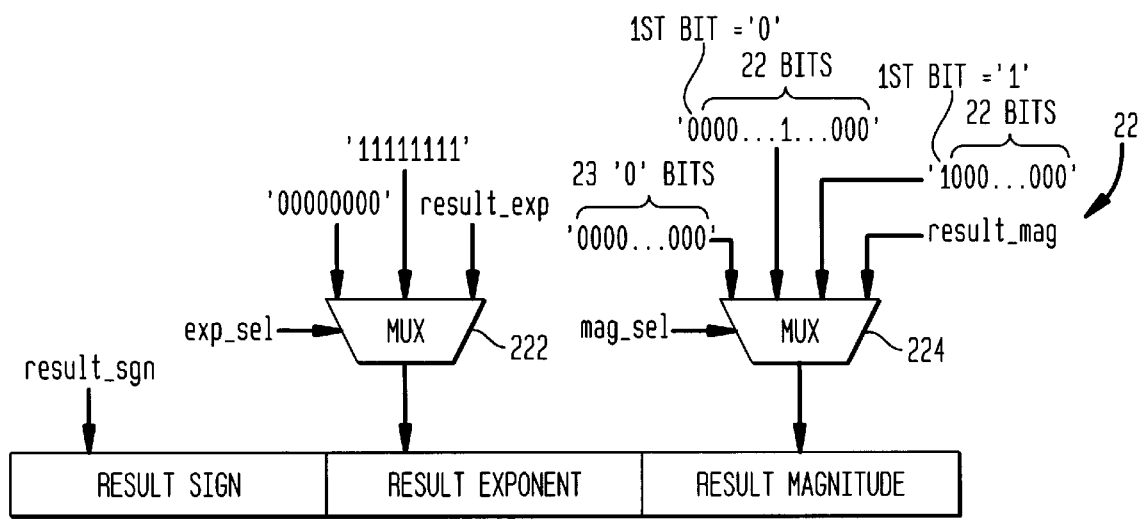
FIG. 2 shows a conventional special operand detector in the circuit of FIG. 1.
Figure 3:
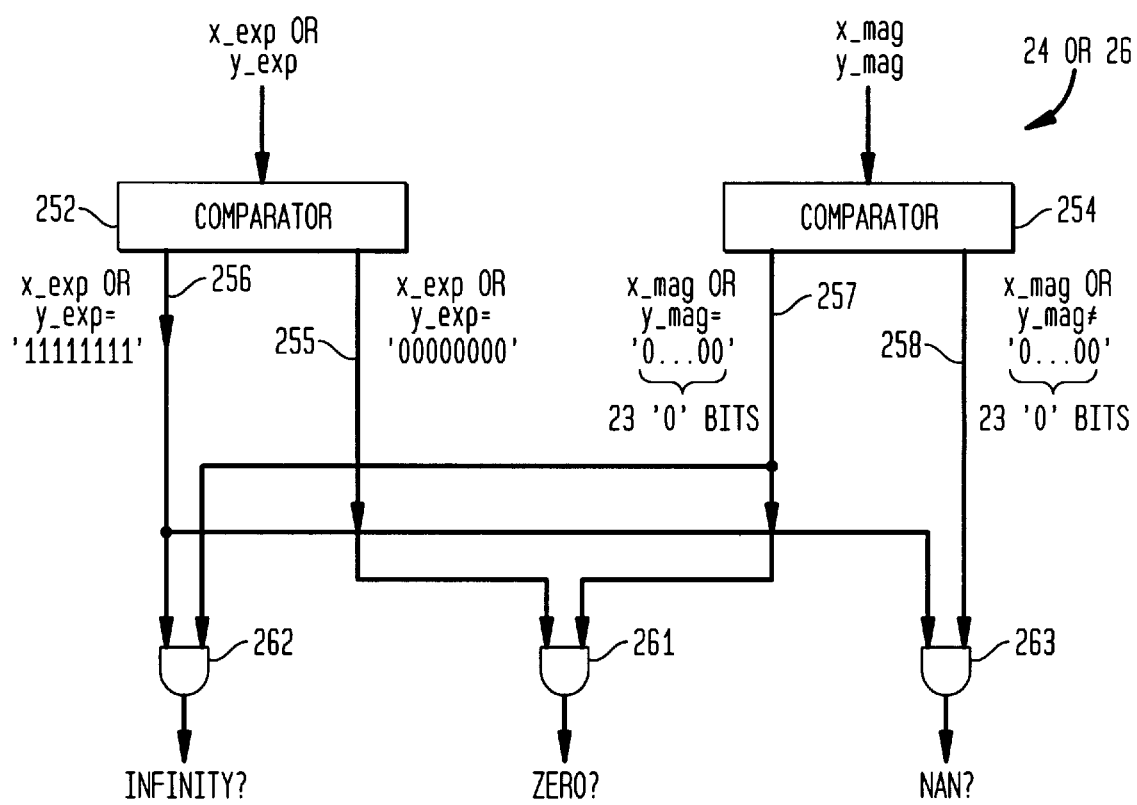
FIG. 3 shows a conventional special operand generator in the circuit of FIG. 1.

During an arithmetic operation, the operands X and/or Y stored in the operand portions 116-1 and 118-1 of the registers 116 and 118 are inputted to the arithmetic section 114 as before. In addition, the tag values x_tag, y_tag stored in the tag portions 116-2 and 118-2 are inputted directly to the arithmetic section as control signals indicating the operand types of the respective operands X and Y. These tag values x_tag, y_tag may be identical or similar to the control signals produced by the conventional detectors 24 and 26 (FIG. 1) described above. Using combinatorial logic in the arithmetic section 114, the tag values x_tag, y_tag indications of the arithmetic operation to be performed and other indicators of the result of the arithmetic operation performed on the operands X and/or Y (e.g., zero, overflow, underflow, etc. status flags) are translated into control signals exp_sel and mag_sel. These control signals exp_sel and mag_sel may be identical or similar to those generated by the arithmetic section 14 of FIG. 1. As in FIGS. 1 and 2, the special operand generator 122 responds to the select control signals exp_sel and mag_sel by outputting the magnitude and exponent produced in the arithmetic section 114 or by substituting magnitude and exponent bit patterns representing special operand values.

As noted above, the tag generator 150 also receives the select control signals exp_sel and mag_sel. In response, the tag generator 150 generates one of the tag values shown in Table 1. In particular, the tag generated by the tag generator accords with the special or ordinary operand to be generated by the special operand generator 122. The following Table 2 summarizes the result exponent and magnitude 'res_exp', 'res_mag' and result tag value 'res_tag' generated by the select control signals exp_sel and mag_sel depending on:

(1) the inputted operands 'op1', 'op2', having exponents 'op1_exp' and 'op2_exp' and magnitudes 'op1_mag' and 'op2_mag', 'op1=op2' means that operands op1 and op2 have identical signs, exponents and magnitudes, 'op1=-op2' means that operands op1 and op2 have identical exponents and magnitudes but opposite polarity sign bits, (2) the input operand tag values 'op1_tag' and 'op2_tag', having values 'uns' (unsupported), 'emp' (empty), 'nan' (not a number), 'zer' (zero), 'inf' (infinity), 'unk' (unknown) 'nor' (normalized) and 'den' (denormalized), (3) the operation to be performed on the inputted operands 'oper', i.e., 'add' (addition), 'sub' (subtraction), 'mul' (multiplication) or 'div' (division), and (4) 'max' means a sequence of eight '1' bits, 'zero' means a sequence of eight '0' bits when it appears in the res_exp column and a sequence of twenty-three '0' bits when it appears in the res_mag column, and 'non-zero' means a '0' or '1' bit followed by twenty-two bits, including at least one '1' bit.

In Table 2, 'x' means "don't care"

TABLE 2

| op1_tag | op2_tag | oper | res_exp | res_mag | res_tag |
|---|---|---|---|---|---|
| nan,uns,emp | x | x | max | non-zero | nan |
| x | nan,uns,emp | x | max | non-zero | nan |

TABLE 2-continued

| op1_tag | op2_tag | oper | res_exp | res_mag | res_tag |
|---|---|---|---|---|---|
| inf,zer | zer | div | max | non-zero | nan |
| zer | nor,den | div | zero | zero | zer |
| zer | zer,nor,den,inf | mul | zero | zero | zer |
| zer,inf,nor,den | zer | mul | zero | zero | zer |
| nor,den (op1=-op2) | nor,den (op1=-op2) | add | zero | zero | zer |
| nor,den (op1=op2) | nor,den (op1=op2) | sub | zero | zero | zer |
| inf | zer,inf,nor,den | add,sub | max | zero | inf |
| zer,inf,nor,den | inf | add,sub | max | zero | inf |
| inf | nor,den | mul,div | max | zero | inf |
| inf | inf | mul | max | zero | inf |
| inf | inf | div | max | non-zero | nan |
| zer | nor | add,sub | op2_exp | op2_mag | nor |
| nor | zer | add,sub | op1_exp | op1_mag | nor |
| zer | den | add,sub | op2_exp | op2_mag | den |
| den | zer | add,sub | op1_exp | op1_mag | den |
| unk,nor,den | unk,nor,den | add,sub,mul,div | x | x | nor |

The denormalized tag and empty tag are generated in the following situations. When a numeric value approaches very close to zero, normalized floating point storage cannot be used to express the value accurately. Therefore, if the result of an arithmetic expression is very close to zero, the number is not normalized. The denormalized tag is set for such denormalized numbers. After initialization, all of the memory storage locations contain no values. The memory tags for all of the storage locations would be set to empty. The empty tag is thus used to distinguish between empty (no numeric value stored therein) and nonempty (storing a numeric value) memory storage locations. For example, in a stack system, when a value is popped from an empty stack, the entry will be an empty entry.

The tag generator 150 can therefore be easily constructed using combinatorial logic gates to output the appropriate bit patterns in response to the arithmetic sections 114.

Note that the generator 150 is not the only mechanism for generating tags. Illustratively, the executable object code compiler (which executes on a processor not shown) also generates appropriate tags for operands and stores them in memory so that they are associated, and can be retrieved with, their respective operands. The unknown tag is generated when a bit pattern representing a floating point number is generated by non-compatible software. For instance, an existing machine language code segment written for a conventional circuit may input a floating point constant for calculation without specifically assigning a tag to the floating point number. Illustratively, the compiler or register file 112 generates the default 'unknown' tag for such numbers. Detectors, such as detector 24 and 26 may be provided in the operand input paths for such unknown operands. While such numbers with unknown tags cannot speed up execution by avoiding detector latency, they can nevertheless be operated on with the circuit 100. Thus, the circuit 100 is backwards compatible with existing software. Note that even when operands of unknown type are inputted to the arithmetic section 114, the produced result receives a tag indicating the operand type other than 'unknown'. Therefore, all results generated by the arithmetic section 114, if used as operands, will avoid the above-noted 'detector' latency.

Finally, the above-discussion is intended to be merely illustrative of the invention. Numerous alternative embodiments may be devised by those having ordinary skill in the art without departing from the spirit and scope of the following claims.

The invention claimed is:

1. A method for generating a result of an arithmetic operation comprising:
   (a) inputting to an arithmetic section at least a first operand and a first tag that indicates whether or not said first operand is a special operand of a predetermined set of special operands, said first tag also indicating which of said special operands said first operand equals, and
   (b) determining in said arithmetic section a value of said result of said arithmetic operation based on said special operand indicated by said first tag and independently of a value of said first operand, and
   (c) outputting said result via select control signals indicating said special operands.

2. The method of claim 1 wherein said first operand comprises a sign portion, a magnitude portion and an exponent portion, wherein, if said first operand is not a special operand, said value of said first operand is determined from said sign, magnitude and exponent portions according to a predetermined formula, and wherein each special operand is represented by a predetermined bit pattern of at least said magnitude and exponent portions.

3. The method of claim 1 wherein said set of special operands includes:
   a zero valued special operand,
   a negative infinity valued special operand,
   a positive infinity valued special operand,
   a non-number special operand,
   a denormalized special operand,
   a user-defined special operand, and
   a specific constant operand.

4. The method of claim 1 further comprising the steps of:
   (d) if said generation of said result produces one of a predetermined set of special operands, generating in said arithmetic section a tag having a predetermined tag value corresponding to said produced one special operand, and
   (e) otherwise generating in said arithmetic section a tag having a predetermined tag value indicating that said result is not a special operand.

5. A method for generating a tag associated with a result of an arithmetic calculation comprising:
   (a) generating in an arithmetic section a result of an arithmetic operation on at least one operand by outputting select control signals indicating special operands, and
   (b) if said generation of said result produces one of a predetermined set of said special operands, generating in a tag generator circuit a tag having a predetermined tag value corresponding to said produced one special operand based on said control signals.

6. The method of claim 5 further comprising the step of:
   (c) if said result of said arithmetic operation is not a special operand, generating in said arithmetic section a tag having a predetermined tag value indicating that said result is not a special operand.

7. A method for representing arithmetic values on which arithmetic operations can be performed using operands having a fixed number of bits comprising:
   (a) storing in a memory a plurality of operands, wherein each operand has a bit pattern representing a particular value, and
   (b) storing in a memory a tag associated with each of said operands, each of said tags having a tag value that indicates whether or not said associated operand represents an ordinary operand value or a special operand value based on select control signals received from an arithmetic section and, if said operand represents a special value, which of a predefined set of special operand values said operand represents.

8. The method of claim 7 wherein a result of at least one arithmetic operation performed on each special operand can be determined from said tag value associated with said special operand and independently of said value represented by said bit pattern or said special operand.

9. The method of claim 7 wherein said value of each ordinary operand can be determined using a predefined formula, and wherein a value of at least one special operand is incapable of being determined by said predefined formula.

10. A circuit for generating a result of an arithmetic operation comprising:
    a memory for outputting at least a first operand and a corresponding first tag that indicates whether or not said first operand is a special operand of a predetermined set of special operands, said first tag also indicating which of said special operands said first operand equals, and
    an arithmetic section, receiving said operands and each corresponding tag from said memory and determining a value of said result of said arithmetic operation based on said special operand indicated by said first tag and independently of a value of said first operand by outputting select control signals indicating said special operands.

11. A circuit for generating a tag associated with a result of an arithmetic calculation comprising:
    an arithmetic section for generating a result of an arithmetic operation on at least one operand by outputting select control signals indicating special operands,
    a tag generator circuit for, if said generation of said result produces one of a predetermined set of special operands, generating a tag having a predetermined tag value corresponding to said produced one special operand based on said control signals, and for generating a tag having a predetermined tag value indicating that said result is not a special operand, if said result is not a special operand based on said control signals, said tags having a tag value that indicates whether or not said associated operand represents an ordinary operand value or a special operand value and, if said operand represents a special value, which of a predefined set of special operand values said operand represents, and
    a memory for storing said result and said tag produced by said tag generator circuit.

12. The circuit of claim 11 wherein said tag generator generates a tag having a predetermined tag value indicating that said result is not a special operand, if said result is not a special operand.

13. A circuit for representing arithmetic values on which arithmetic operations can be performed using operands having a fixed number of bits comprising at least one memory for storing a plurality of operands, wherein each operand has a bit pattern representing a particular value, and storing a tag, based on select control signals received from an arithmetic section, associated with each of said operands, each of said tags having a tag value that indicates whether or not said associated operand represents an ordinary operand value or a special operand value and, if said operand represents a special value, which of a predefined set of special operand values said operand represents.

* * * * *